US012724870B2

(12) United States Patent
Agrawal et al.

(10) Patent No.: US 12,724,870 B2
(45) Date of Patent: Sep. 1, 2026

(54) PASSWORD HINT GENERATION BASED ON IDENTIFYING PASSWORD INSTRUCTIONS AND USER INFORMATION

(71) Applicant: MOTOROLA MOBILITY LLC, Wilmington, DE (US)

(72) Inventors: Amit Kumar Agrawal, Bangalore (IN); Panduranga Reddy Pailla, Nalgonda (IN); Vijayprakash Idlur, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 21 days.

(21) Appl. No.: 18/888,083

(22) Filed: Sep. 17, 2024

(65) Prior Publication Data

US 2026/0080050 A1 Mar. 19, 2026

(51) Int. Cl.
*H04L 29/06* (2006.01)
*G06F 21/31* (2013.01)
*G06F 21/45* (2013.01)

(52) U.S. Cl.
CPC .............. *G06F 21/45* (2013.01); *G06F 21/31* (2013.01)

(58) Field of Classification Search
CPC ...................................................... G06F 21/45
See application file for complete search history.

(56) References Cited

U.S. PATENT DOCUMENTS

2011/0113486 A1* 5/2011 Hunt ..................... G06F 3/0485 726/19
2015/0281216 A1* 10/2015 Donohue ............. H04L 63/105 713/171
2018/0247044 A1* 8/2018 Liu ......................... G06F 21/36
2020/0210572 A1* 7/2020 Devane ................. G06F 21/566
2024/0146734 A1* 5/2024 Southgate ........... G06F 21/6227

* cited by examiner

*Primary Examiner* — Jason K Gee
(74) *Attorney, Agent, or Firm* — Isidore PLLC

(57) ABSTRACT

An electronic device, a method, and a computer program product assist users in accessing password protected documents by automating password hint generation. The electronic device includes a controller communicatively coupled to input device(s), output device(s) including a display, and memory that stores user information. In response to detecting a password prompt to enter a password to perform one of password-encrypt or password-decrypt the computer-readable file, the controller is configured to cause the device to identify password instruction(s) associated with the password. The controller analyzes the user information for candidate segment(s) that comply with the password instruction(s). The controller assembles password hint(s) mapping the candidate segment(s) according to the password instruction(s). The controller renders a prompt containing the password hint(s) and modifies the output device(s) to present the password prompt containing the password hint(s), wherein the password prompt is associated with the computer-readable file and presented via the output device(s).

20 Claims, 5 Drawing Sheets

PASSWORD HINT GENERATION BASED ON IDENTIFYING PASSWORD INSTRUCTIONS AND USER INFORMATION

BACKGROUND

1. Technical Field

The present disclosure relates generally to electronic devices having a user interface for accessing or storing electronic documents, and more particularly to electronic devices having a user interface for accessing or storing password-protected electronic devices.

2. Description of the Related Art

As technology has advanced, uses for electronic devices have expanded to include creating, modifying, and archiving electronic documents (e.g., word processing, spreadsheet, presentations, forms, etc.), largely replacing working directly with hardcopy documents. To protect confidentiality, electronic documents are frequently encrypted with password protection as a security measure to restrict access to files or data by requiring a password for authentication. This practice is commonly used for confidential or private information to prevent unauthorized access.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
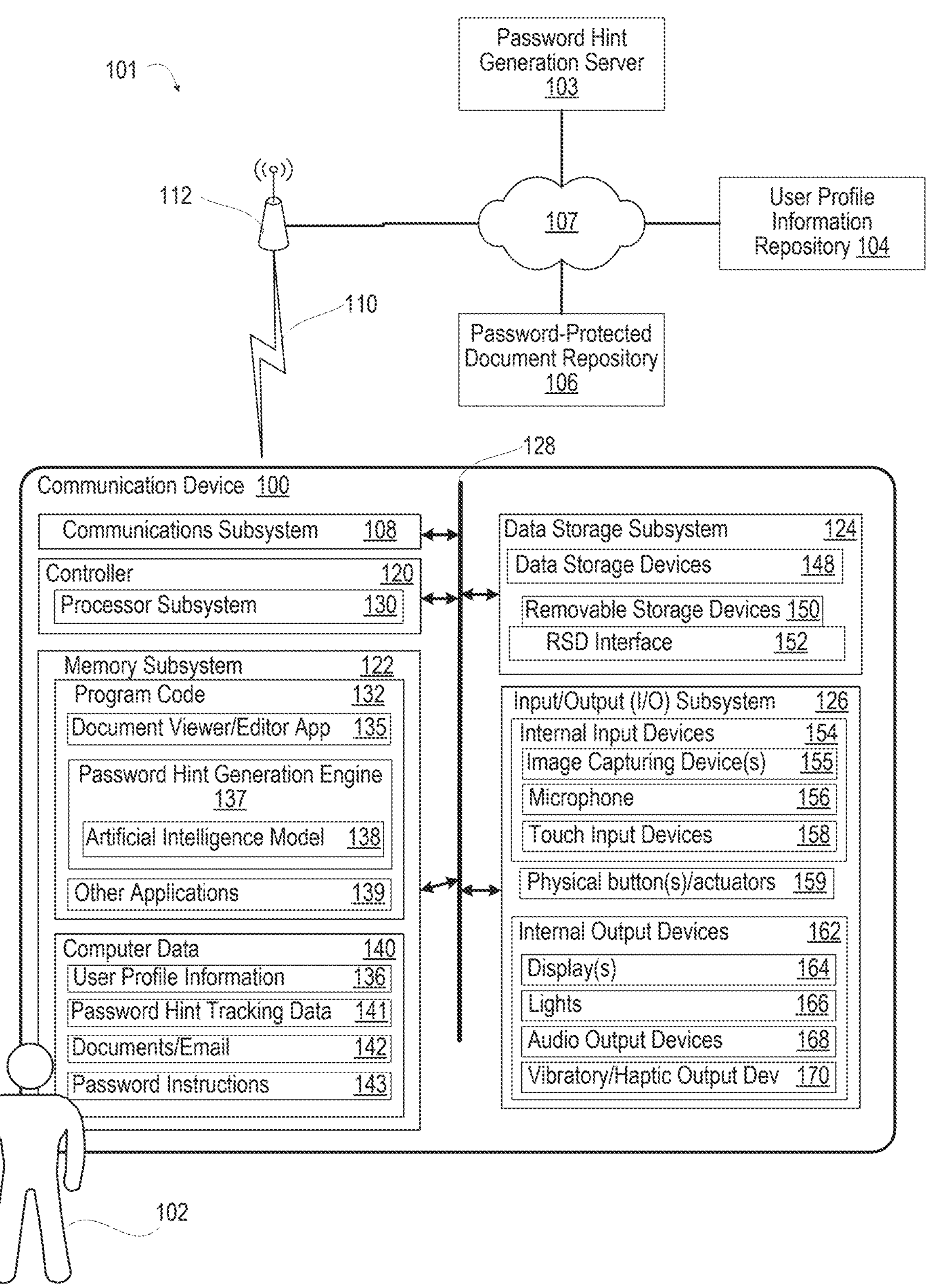
FIG. 1 presents a simplified functional block diagram of an electronic device in which the features of the present disclosure are advantageously implemented for, according to one or more embodiments.

According to aspects of the present disclosure, an electronic device, a method and a computer program product assist users in generating passwords and accessing password protected documents by automating password hint generation. Trying to guess a password without hints may be difficult even though password-protected file creators (e.g., companies or users) often follow a user-centric approach by trying to use a password format that can include user profile data. However, in certain situations, the user will still find it difficult to recollect the password. In an example, the user may have a large number of password-protected files with different passwords, necessitated by different required password formats and by password expiration requirements. In another example, users may change their password creation preferences and forget older passwords built with different terms. Conventionally, to help users remember passwords and ensure authorized access, users may send themselves password hints via email. The hints may also be system generated and emailed to the user. These hints are typically clues or reminders related to the password, making it easier for the file owner to recall the correct access code. Password protection with email hints strikes a balance between security and user-friendliness. While the password adds a layer of defense against unauthorized access, the hint serves as a safety net for the file owner to regain access in case they forget the password. However, old emails may be difficult or impossible to find. Thus, there is a need for an intelligent system to create or suggest passwords for specific protected files, in accordance with contextual password formats described for the file.

In one or more embodiments, the electronic device has at least one input device, at least one output device including a display, a memory that stores user information, and a controller. The controller is communicatively coupled to the at least one input device, the at least one output device, and the memory. In response to detecting a password prompt to enter a password to perform one of password-encrypt or password-decrypt the computer-readable file, the controller is configured to cause the device to identify one or more password instruction associated with the password. The controller is configured to cause the electronic device to analyze the user information for one or more candidate segments that comply with the one or more password instruction. The controller is configured to cause the electronic device to assemble at least one password hint mapping the one or more candidate segments according to the one or more password instruction. The controller is configured to cause the electronic device to render a prompt containing the at least one password hint. The controller is configured to cause the electronic device to modify the at least output device to present the password prompt containing the at least one password hint, wherein the password prompt is associated with the computer-readable file and presented via the at least one output device.

According to additional aspects of the present disclosure, the electronic system, method, and computer program product provide password hint generation from profile data of a user using contextual cues. The present disclosure provides for generating passwords for a password protected file by leveraging profile data of the user in accordance with contextual password formats described for the file. The electronic device determines the presence of password-protected files by utilizing file attributes and metadata. In one or more embodiments, the electronic device detects consent of the user to utilize user's profile data to recommend contextual password generation and management for password protected files.

In one or more embodiments, the electronic device enables an artificial intelligence (AI) model ("AI assistant") to capture user information. The electronic device trains the AI model with the profile data (e.g., first name, middle name, last name, date of birth (DOB), government identification number (e.g., permanent account number (PAN), social security number (SSN), mother's maiden name, etc.). The electronic device implements a password instructions detection module to detect instructions (i.e., contextual cues) from user email, a website, and stored documents on how to generate the password for the password protected files. The electronic device constructs password hints based on mapping specific user profile data in accordance with detected password instructions. The electronic device may then detect the user opening the password protected file. In response, the electronic device surfaces or presents (e.g., visually, aurally, or haptically) the suggested password hints from the AI assistant. In response detecting usage of the password hint with successful unlocking of the password protected file, the electronic device may provide a mechanism to store the password suggestions with a linked association to the password protected file for future access without needing to reparse the password instructions. The electronic device may further train the AI assistant with successful password and hints to enhance an ability of the AI assistant to generate accurate and helpful password hints based on evolving user behavior and contextual cues.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic device in which the features of the present disclosure are advantageously implemented for assisting users in accessing password protected documents by automating password hint generation. In one or more embodiments, the electronic device includes additional communications functionality that enables the electronic device to be referred to as communication device 100, which operates as a mobile user device for user 102 in communication environment 101. Aspects of the present disclosure may be implemented at least in part in password hint generation server(s) 103 that includes some or all of the components and functionality described herein. In the specific example of FIG. 1, communication environment 101 includes one or more user profile information server 104 and password-protected document server 106, which are accessible to communication device 100 through communication network 107. Communications device 100 includes communications subsystem 108 that connects via wired or wireless channel 110 to node 112 (e.g., wireless access point, cellular tower) to communicatively connect to password hint generation server(s) 103, user profile information server 104, and password-protected document server 106, via one or more communication network 107.

Communication device 100 can be one of a host of different types of devices, including but not limited to, a mobile cellular phone, satellite phone, or smart phone, a laptop, a netbook, an ultra-book, a networked smartwatch, or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices. User 102 may use one or more second electronic devices similar or identical to communication device 100, with preferences shared across devices.

In addition to communications subsystem 108 and controller 120, communication device 100 may include memory subsystem 122, data storage subsystem 124 and input/output (I/O) subsystem 126. To enable management by controller 120, system interlink 128 communicatively connects controller 120 with communications subsystem 108, memory subsystem 122, data storage subsystem 124 and I/O subsystem 126. System interlink 128 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 128) are illustrated in FIG. 1, it is to be understood that more, fewer, or different interconnections may be present in other embodiments.

Controller 120 includes processor subsystem 130, which includes one or more central processing units (CPUs) or data processors. Processor subsystem 130 can include one or more digital signal processors and graphics processing units (GPUs), etc. that can be integrated with data processor(s). Processor subsystem 130 can include other processors such as auxiliary processor(s) that may act as a low power consumption, always-on sensor hub for physical sensors. Controller 120 manages, and in some instances directly controls, the various functions and/or operations of communication device 100. These functions and/or operations include, but are not limited to including, application data processing, communication, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Memory subsystem 122 (or generally memory 122) stores program code 132 for execution by processor subsystem 130 to provide the functionality described herein. Program code 132 includes applications such as document viewer/editor application 135 and password hint generation engine 137 that may include artificial intelligence model 138, and other applications 139.

In one or more embodiments, several of the described aspects of the present disclosure are provided via executable program code of applications executed by controller 120. In one or more embodiments, program code 132 may be integrated into a distinct chipset or hardware module as firmware that operates separately from executable program code. Portions of program code 132 may be incorporated into different hardware components that operate in a distributed or collaborative manner. Memory subsystem 122 further includes operating system (OS), firmware interface, such as basic input/output system (BIOS) or Uniform Extensible Firmware Interface (UEFI), and firmware, which also includes and may thus be considered as program code 132.

Program code 132 may access, use, generate, modify, store, or communicate computer data 140, such as user profile data 136, password hint tracking data 141, documents/email 142, and password instructions data 143 that supports, and is updated by, password hint generation engine 137. Computer data 140 may incorporate "data" that originated as raw, real-world "analog" information that consists of basic facts and figures. Computer data 140 includes different forms of data, such as numerical data, images, coding, notes, and financial data. Computer data 140 may originate at communication device 100 or be retrieved from a remote device via communications subsystem 108. Communication device 100 may store, modify, present, or transmit computer data 140, such as password hint tracking data 141. Computer data 140 may be organized in one of a number of different data structures. Common examples of computer data 140 include video, graphics, text, and images. Computer data 140 can also be in other forms of flat files, databases, and other data structures.

Data storage subsystem 124 of communication device 100 includes data storage device(s) 148. Controller 120 is communicatively connected, via system interlink 128, to data storage device(s) 148. Data storage subsystem 124 provides program code 132 and computer data 140 stored on nonvolatile storage that is accessible by controller 120. For example, data storage subsystem 124 can provide a selection of program code 132 and computer data 140. These applications can be loaded into memory subsystem 122 for execution/processing by controller 120. In one or more embodiments, data storage device(s) 148 can include hard disk drives (HDDs), optical disk drives, and/or solid-state drives (SSDs), etc. Data storage subsystem 124 of communication device 100 can include removable storage device(s) (RSD(s)) 150, which is received in RSD interface 152. Controller 120 is communicatively connected to RSD 150, via system interlink 128 and RSD interface 152. In one or more embodiments, RSD 150 is a non-transitory computer program product or computer readable storage device that stores program code and/or instructions that may be executed by a processor associated with a user device such as communication device 100. Controller 120 can access data storage device(s) 148 or RSD 150 to provision communication device 100 with program code 132 and computer data 140.

I/O subsystem 126 may include internal input devices 154 such as image capturing device(s) 155, microphone 156, and touch input devices 158 (e.g., screens, keys, or buttons). I/O subsystem 126 may include physical buttons/actuators 159 that can be located on a periphery of the device housing. I/O subsystem 126 may include internal output devices 162 such as display(s) 164, lights 166, audio output devices 168, and vibratory or haptic output devices 170.

In one or more embodiments, controller 120, via communications subsystem 108, performs multiple types of cellular over-the-air (OTA) connections. In one or more embodiments, controller 120, via communications subsystem 108, may communicate via an OTA cellular connection with radio access networks (RANs). In an example, communication device 100, via communications subsystem 108, connects via RANs of a terrestrial network that is communicatively connected to a network server. In one or more embodiments, controller 120, via communications subsystem 108, communicates via a wireless local area network (WLAN) link using one or more IEEE 802.11 WLAN protocols with an access point. In one or more embodiments, controller 120, via communications subsystem 108, performs other types of wireless communication, such as by using a Bluetooth connection or other personal access network (PAN) connection. In an example, a user may wear a health monitoring device such as a smartwatch that is communicatively coupled to communication device 100 via a wireless connection. In one or more embodiments, communications subsystem 108 includes a global positioning system (GPS) module that receives GPS broadcasts from GPS satellites to obtain geospatial location information, which enables communication device 100 to self-locate, among other features.

In one or more embodiments, password hint generation engine 137 includes artificial intelligence (AI) model 138 that is trained to locate password instructions and user profile data and to assemble password hint(s) based on the password instructions and user profile data. Password hint generation engine 137 and AI model 138 may be stored in memory subsystem 122 of communication device 100 and executed by controller 120 to perform various aspects of the functionality of the present disclosure. Training of AI model 138 is the process by which AI models are trained to perform specific tasks or achieve certain objectives. The training involves providing the model with a large amount of data and allowing the model to learn from patterns and relationships within that data. AI model 138 may include an artificial neural network, a decision tree, a support vector machine, Hidden Markov model, linear regression, logistic regression, Bayesian networks, and so forth. The AI model 138 can be individually trained to perform specific tasks and can be arranged in different sets of AI models to generate different types of output.

According to aspects of the present disclosure, in response to detecting a password prompt to enter a password to perform one of password-encrypt or password-decrypt the computer-readable file, controller 120 is configured to cause communication device 100 to identify one or more password instruction associated with the password. Controller 120 is configured to cause communication device 100 to analyze the user information for one or more candidate segments that comply with the one or more password instruction. Controller 120 is configured to cause communication device 100 to assemble at least one password hint mapping the one or more candidate segments according to the one or more password instruction. Controller 120 is configured to cause communication device 100 to render a prompt containing the at least one password hint. Controller 120 is configured to cause communication device 100 to modify the at least output device to present the password prompt containing the at least one password hint. The password prompt is associated with the computer-readable file and is presented via the at least one output device (162) such as display(s) 164.

In one or more embodiments, in response to detecting the password prompt to enter the password to password decrypt the computer-readable file, controller 120 is configured to cause communication device 100 to identify an origin of the computer-readable file by parsing file attributes and metadata. Controller 120 is configured to cause communication device 100 to identify the one or more password instruction based on the origin of the computer-readable file.

In one or more embodiments, communications subsystem 108 of communication device 100 is communicatively couplable, via a communication network 107, to at least one network device that administers password-encrypted operations with a computer-readable file. In response to detecting the password prompt to enter the password to password decrypt the computer-readable file, controller 120 is configured to cause communication device 100 to identify the one or more password instruction based on the origin of the computer-readable file by querying, via the communication subsystem and the network, one or more websites associated with the computer-readable file. In one or more particular embodiments, controller 120 is configured to cause communication device 100 to identify the one or more password instruction based on the origin of the computer-readable file by querying one or more information sources of a group including: (i) email; and (ii) documents stored in password-protected document server 106 or memory subsystem 122.

In one or more embodiments, controller 120 is configured to cause communication device 100 to render a consent interface containing a control that enables or disables generation of the at least one password hint. Controller 120 is configured to cause communication device 100 to modify the display to contain the consent interface. Controller 120 is configured to cause communication device 100 to generate the at least one password hint based in part on receiving an enable input to the control. In one or more embodiments, in response to detecting a password input via the at least one input device that succeeds in one of decrypting or encrypting the computer-readable file, controller 120 is configured to cause communication device 100 to store a password hint that corresponds to the password for future use in decrypting the computer-readable file.

In one or more embodiments, in analyzing the user information for one or more candidate segments that comply with the one or more password instruction, controller 120 is configured to cause communication device 100 to train an artificial intelligence engine (AI model 138) with the user information to identify the one or more candidate segments known to user 102 of communication device 100. In one or more embodiments, in response to detecting a password input via the at least one input device that succeeds in one of decrypting or encrypting the computer-readable file, controller 120 is configured to cause communication device 100 to train an artificial intelligence engine (AI model 138) with the password input for subsequent identifications of candidate segments known to user 102 of communication device 100.

Figure 2:
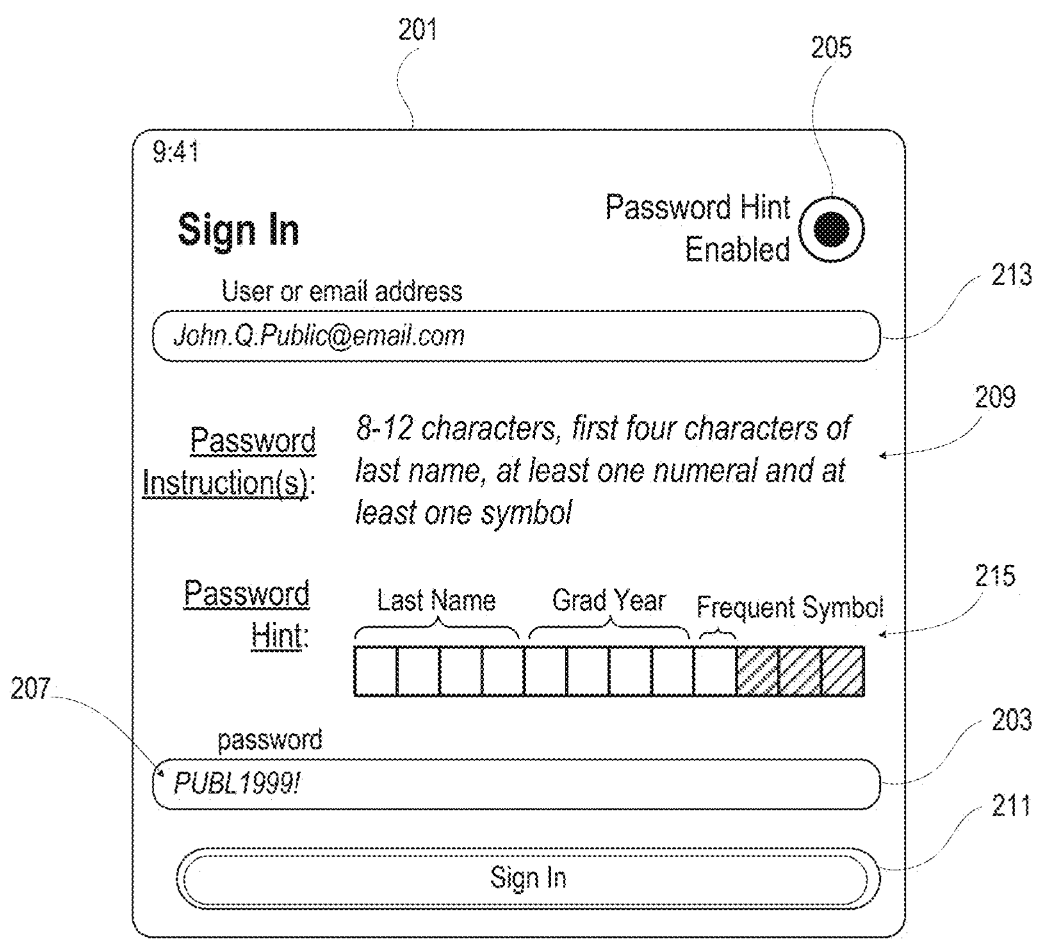
FIG. 2 is a document sign-in interface segment that provides a password prompt in support of opening a password-protected document, according to one or more embodiments.

FIG. 2 presents document sign-in interface segment 201 (or user interface) that provides password prompt 203 in support of opening a password-protected document. Interface segment 201 also includes/presents password hint enabled control 205, password instruction(s) 209, and password hint(s) 215. According to some embodiments, opening of a file, document or other access portal can trigger presentation of interface segment 201, and toggling/selection of password hint enabled control 205 can trigger presentation of password hint generation (215) within interface segment 201. When password hint enabled control 205 is toggled to disable presentation of a password hint, a password hint is not displayed. It is appreciated that password hint enabled control 205 can be a default (or user-provided) setting on the user device for user notification when generating passwords and accessing files requiring passwords, such that no toggling of control (205) is required. Once an acceptable password is entered in password entry option 207 that satisfies password instruction(s) 209, sign in control 211 triggers implementation of an entered password. In one or more embodiments, opening a password-protected document may be associated with a particular user identification (e.g., email address "John.Q.Public@email.com") 213. According to aspects of the present disclosure, communication device 100 may locate password instruction(s) 209 and generate password hint(s) 215. In an example, password instruction(s) 209 include "8-12 characters, first four characters of last name, at least one numeral, and at least one symbol." Based on user profile data and tracking of past password creation, password hint is generated as 4-characters for last name, 4-digits for "grad year", and 1-character "frequent symbol". In an example, the user may frequently use their high school or college graduation year for a number and use "!" when required to add a symbol. Password "PUBL1999!" is an example of a compliant password for opening or encrypting a password-protected document.

Figure 3:
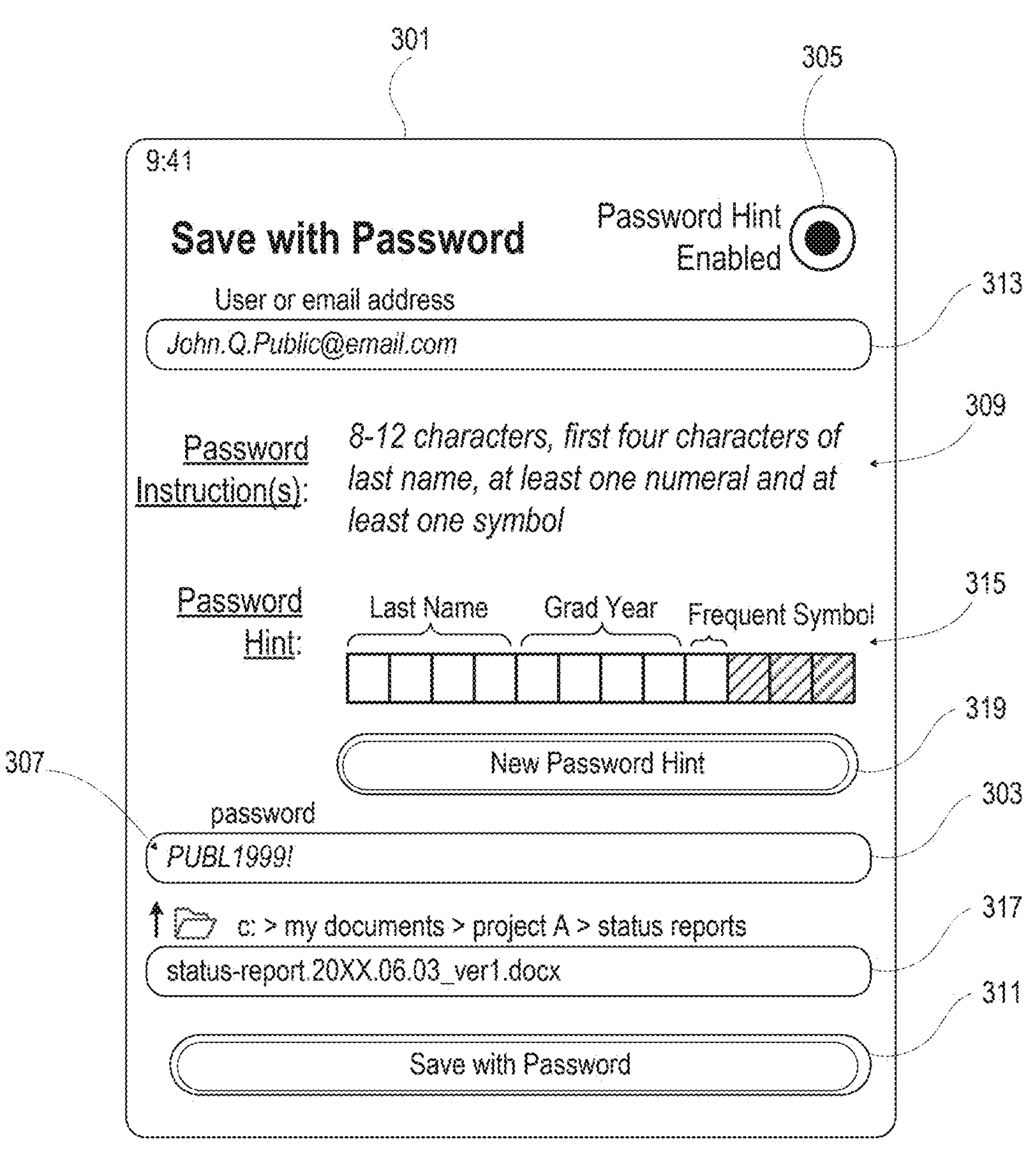
FIG. 3 is a document save interface segment that provides a password prompt in support of password protecting a document.

FIG. 3 presents document save interface segment 301 that provides password prompt 303 in support of password protecting a document. Interface segment 301 also includes/presents password hint enabled control 305, password instruction(s) 309, and password hint(s) 315. According to some embodiments, saving of a file, document or other access portal can trigger presentation of interface segment 301, and toggling/selection of password hint enabled control 305 can trigger presentation of password hint generation (315) within interface segment 301. It is appreciated that password hint enabled control 305 can be a default (or user-provided) setting on the user device for user notification when generating passwords and saving files requiring or optionally allowing passwords, such that no toggling of control (305) is required. Once an acceptable password is entered in password entry option 307 that satisfies password instruction(s) 309, save control 311 triggers implementation of an entered password. In one or more embodiments, password protecting a document may be associated with a particular user identification (e.g., email address "John.Q.Public@email.com") 313. According to aspects of the present disclosure, communication device 100 may locate password instruction(s) 309 and generate password hint(s) 315. Filename control 317 enables setting file save location and filename. In one or more embodiments, controller 120 (FIG. 1) configures document save interface segment 301 to require entering a password that is compliant with password instruction(s) 309 before save control 311 becomes effective. In an example, save control 311 is grayed out to indicate being ineffective. In one or more embodiments, controller 120 (FIG. 1) configures document save interface segment 301 to not require entering a password that is compliant with password instruction(s) 309 before password encrypting a document. Password protection is optional subject to user preference. Omitting a password when a password is not required would cause save control 311 to have a label change to "Save Without Password". In one or more embodiments, selecting new password hint control 319 repeats hint generation to provide an alternative hint.

Figure 4A:
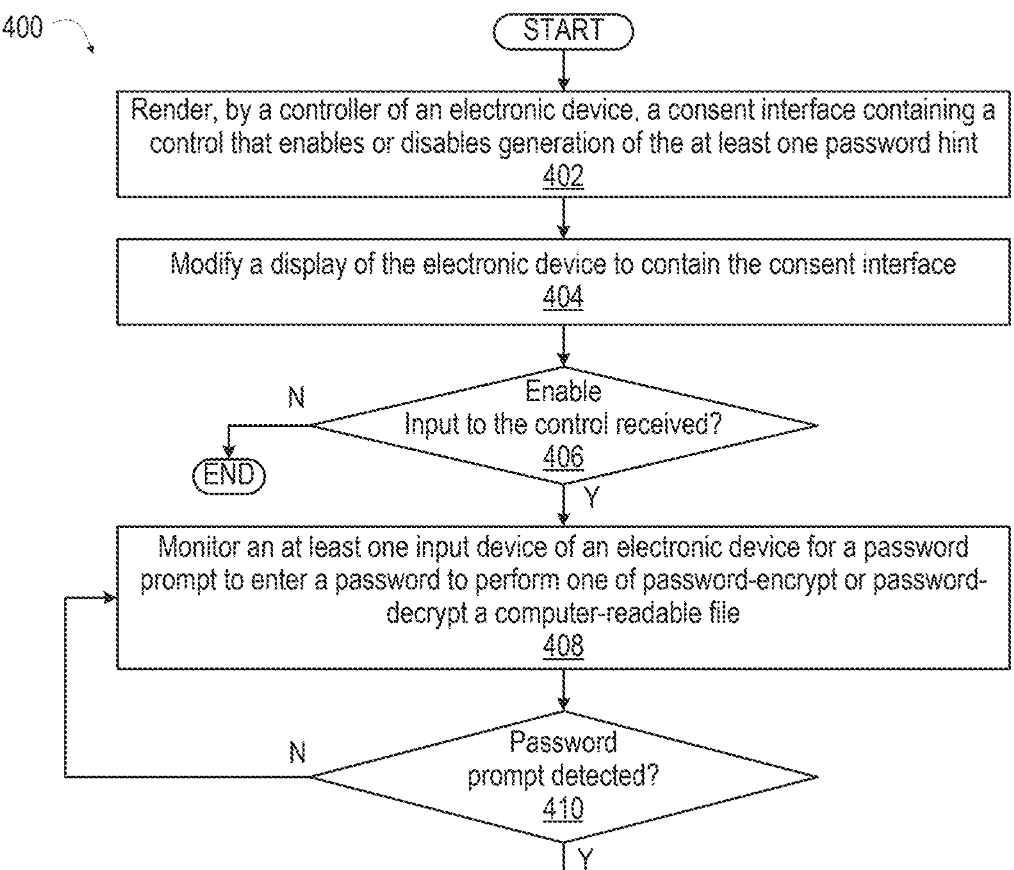
FIGS. 4A-4B (collectively "FIG. 4") are a flow diagram presenting a method for assisting users in accessing or saving password protected documents by automating password hint generation, according to one or more embodiments.
Figure 4B:
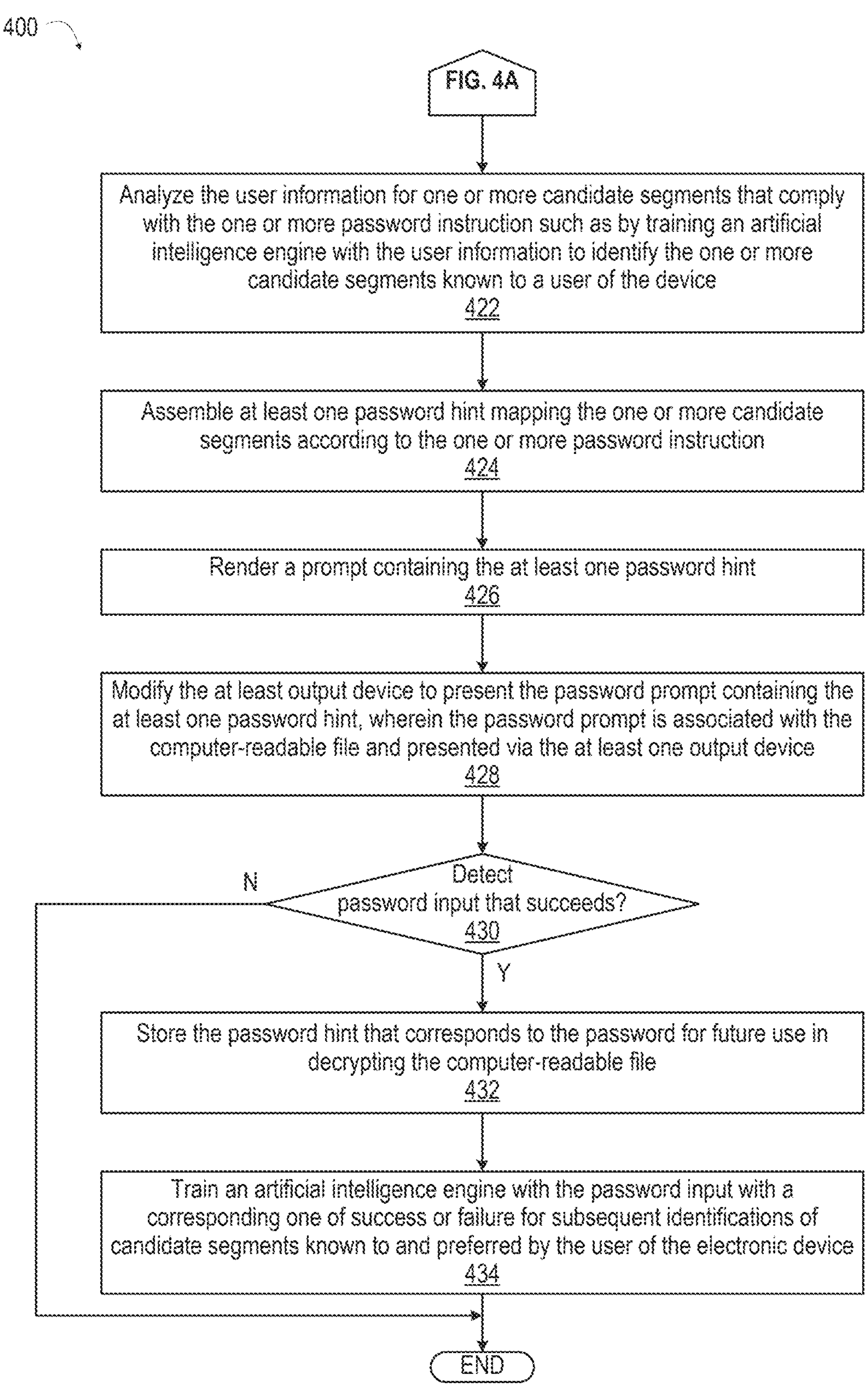

FIGS. 4A-4B (collectively "FIG. 4") are a flow diagram presenting method 400 for assisting users in accessing or saving password protected documents by automating password hint generation. The description of method 400 is provided with general reference to the specific components illustrated within the preceding FIGS. 1-3. Specific components referenced in method 400 (FIG. 4) may be identical or similar to components of the same name used in describing preceding FIGS. 1-3. In one or more embodiments, controller 120 (FIG. 1) configures communication device 100 (FIG. 1) or a similar computing device to provide the described functionality of method 400 (FIG. 4).

With reference to FIG. 4A, method 400 includes rendering, by a controller of an electronic device, a consent interface containing a control that enables or disables generation of at least one password hint (block 402). Method 400 includes modifying a display of the electronic device to contain the consent interface (block 404). Method 400 includes determining whether an enable input to the control is received via at least one input control of the electronic device for generating the at least one password hint (decision block 406). In response to determining that the enable input to the control is not received, method 400 ends. In response to determining that the enable input to the control is received, method 400 includes monitoring an at least one input device of an electronic device for a password prompt to enter a password to perform one of password-encrypt or password-decrypt a computer-readable file (block 408). Method 400 includes determining whether the password prompt is detected (decision block 410). In response to determining that the password prompt is not detected, method 400 returns to block 410. In response to determining that the password prompt is detected, method 400 includes identifying one or more password instruction(s) associated with the password (box 412). In an example, method 400 includes identifying an origin of the computer-readable file by parsing file attributes and metadata (block 414). In another example, method 400 includes identifying an origin of the computer-readable file by querying one or more information sources of a group comprising: (i) email; and (ii) documents stored in the device memory (block 416). In an additional example, method 400 includes identifying an origin of the computer-readable file by querying at least one network device that administers password-encrypted operations with the computer-readable file (block 418). In an additional example, method 400 includes identifying an origin of the computer-readable file, via the communication subsystem and the network, by analyzing one or more websites associated with the computer-readable file (block 420). Then method 400 proceeds to block 420 (FIG. 4B).

With reference to FIG. 4B, method 400 includes analyzing the user information for one or more candidate segments that comply with the one or more password instruction, such as by training an artificial intelligence engine with the user information to identify the one or more candidate segments known to a user of the device (block 422). Method 400 includes assembling at least one password hint mapping the one or more candidate segments according to the one or more password instruction (block 424). Method 400 includes rendering a prompt containing the at least one password hint (block 426). Method 400 includes modifying the at least output device to present the password prompt containing the at least one password hint, wherein the password prompt is associated with the computer-readable file and presented via the at least one output device (block 428). Method 400 includes determining whether a password input is detected that succeeds in one of decrypting or encrypting the computer-readable file (decision block 430). In response to determining the password input is detected that succeeds in one of decrypting or encrypting the computer-readable file, method 400 includes storing the password hint that corresponds to the password for future use in decrypting the computer-readable file (block 432). In one or more embodiments, in response to determining the password input is detected that does not succeed in one of decrypting or encrypting the computer-readable file in decision block 430 or after storing the password hint in block 432, method 400 includes training an artificial intelligence engine with the password input with a corresponding one of success or failure for subsequent identifications of candidate segments known to and preferred by the user of the electronic device (block 434). Then method 400 ends.

In one or more embodiments, in response to detecting the password prompt to enter the password to password decrypt the computer-readable file, method 400 includes identifying an origin of the computer-readable file by parsing file attributes and metadata. Method 400 includes identifying the one or more password instruction based on the origin of the computer-readable file.

In one or more embodiments, method 400 includes coupling, via a communications subsystem of the electronic device via a network, to at least one network device that administers password-encrypted operations with the computer-readable file. In response to detecting the password prompt to enter the password to password decrypt the computer-readable file, method 400 includes identifying the one or more password instruction based on the origin of the computer-readable file by querying, via the communication subsystem and the network, one or more websites associated with the computer-readable file. In one or more particular embodiments, method 400 includes identifying the one or more password instruction based on the origin of the computer-readable file by querying one or more information sources of a group comprising: (i) email; and (ii) documents stored in the memory.

In one or more embodiments, method 400 includes rendering a consent interface containing a control that enables or disables generation of the at least one password hint. Method 400 includes modifying a display to contain the consent interface. Method 400 includes generating the at least one password hint based in part on receiving an enable input to the control. In one or more embodiments, in response to detecting a password input via the at least one input device that succeeds in one of decrypting or encrypting the computer-readable file, method 400 includes storing a password hint that corresponds to the password for future use in decrypting the computer-readable file.

In one or more embodiments, method 400 includes analyzing the user information for one or more candidate segments that comply with the one or more password instruction by training an artificial intelligence engine with the user information to identify the one or more candidate segments known to a user of the device. In one or more embodiments, in response to detecting a password input via the at least one input device that succeeds in one of decrypting or encrypting the computer-readable file, method 400 includes further training an artificial intelligence engine with the password input for subsequent identifications of candidate segments known to the user of the device.

According to aspects of the present disclosure, the communication device 100 (FIG. 1), method 400, and computer program product, such as RSD 150 (FIG. 1), assist users in generating passwords and accessing password protected documents by automating password hint generation. The assistance includes locating password instructions (e.g., password format requirements). For already created password-protected documents, the assistance includes looking for stored hints created automatically by the document creating entity (e.g., software application for generating, editing or viewing a document, a website portal for creating a filled-in form, etc.) or created by the user (e.g., sending an email back to the user). Conventionally, to help users remember passwords and ensure authorized access, users may send themselves password hints via email. The hints may also be system generated and emailed to the user. These hints are typically clues or reminders related to the password, making it easier for the file owner to recall the correct access code. The present disclosure provides for finding such archived password hints that may not be readily accessible to the user. For password protecting a document, the assistance includes determining the applicable patent instructions and drawing upon user profile data to suggest password hints for creating a password that is easy to remember or recollect. Once a password is successfully used to create or open a password-protected document, the assistance includes saving the successful password hint(s) for expeditious use in the future in opening the same password-protected document.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:

at least one input device;

at least one output device, the at least one output device comprising a display;

a memory that stores user information; and a controller communicatively coupled to the at least one input device, the at least one output device, and the memory and which is configured to cause the device to:

in response to detecting a password prompt to enter a password to perform one of password-encrypt or password-decrypt a computer-readable file:

identify an origin of the computer-readable file;

identify, based on the origin of the computer-readable file, one or more password instruction associated with the password;

analyze the user information for one or more candidate segments that comply with the one or more password instruction;

assemble at least one password hint mapping the one or more candidate segments according to the one or more password instruction;

render a prompt containing the at least one password hint; and modify the at least output device to present the password prompt containing the at least one password hint, wherein the password prompt is associated with the computer-readable file and presented via the at least one output device.

2. The electronic device of claim 1, wherein the controller is configured to cause the electronic device to:

in response to detecting the password prompt to enter the password to password decrypt the computer-readable file:

identify the origin of the computer-readable file by parsing file attributes and metadata.

3. The electronic device of claim 1, further comprising a communications subsystem communicatively couplable, via a network, to at least one network device that administers password-encrypted operations with the computer-readable file, and wherein the controller is configured to cause the device to, in response to detecting the password prompt to enter the password to password decrypt the computer-readable file, identify the one or more password instruction based on the origin of the computer-readable file by querying, via the communication subsystem and the network, one or more websites associated with the computer-readable file.

4. The electronic device of claim 1, wherein the controller is configured to cause the device to:

identify the one or more password instruction based on the origin of the computer-readable file by querying one or more information sources of a group comprising: (i) email; and (ii) documents stored in the memory.

5. The electronic device of claim 1, wherein the controller is configured to cause the device to:

render a consent interface containing a control that enables or disables generation of the at least one password hint;

modify the display to contain the consent interface; and generate the at least one password hint based in part on receiving an enable input to the control.

6. The electronic device of claim 1, wherein, in analyzing the user information for one or more candidate segments that comply with the one or more password instruction, the controller is configured to cause the device to:

train an artificial intelligence engine with the user information to identify the one or more candidate segments known to a user of the device.

7. The electronic device of claim 1, wherein the controller is configured to cause the device to:

in response to detecting a password input via the at least one input device that succeeds in one of decrypting or encrypting the computer-readable file:

train an artificial intelligence engine with the password input for subsequent identifications of candidate segments known to the user of the device.

8. The electronic device of claim 1, wherein the controller is configured to cause the device to:

in response to detecting a password input via the at least one input device that succeeds in one of decrypting or encrypting the computer-readable file:

store a password hint that corresponds to the password for future use in decrypting the computer-readable file.

9. A method comprising:

in response to detecting a password prompt, via at least one input device of an electronic device, to enter a password to perform one of password-encrypt or password-decrypt a computer-readable file:

identifying an origin of the computer-readable file;

identifying, based on the origin of the computer-readable file, one or more password instruction associated with the password;

analyzing user information for one or more candidate segments that comply with the one or more password instruction;

assembling at least one password hint mapping the one or more candidate segments according to the one or more password instruction;

rendering a prompt containing the at least one password hint; and modifying at least output device to present the password prompt containing the at least one password hint, wherein the password prompt is associated with the computer-readable file and presented via the at least one output device.

10. The method of claim 9, further comprising:

in response to detecting the password prompt to enter the password to password decrypt the computer-readable file:

identifying the origin of the computer-readable file by parsing file attributes and metadata.

11. The method of claim 9, further comprising:

connecting, via a communications subsystem of the electronic device via a network, to at least one network device that administers password-encrypted operations with the computer-readable file; and in response to detecting the password prompt to enter the password to password decrypt the computer-readable file, identifying the one or more password instruction based on the origin of the computer-readable file by querying, via the communication subsystem and the network, one or more websites associated with the computer-readable file.

12. The method of claim 9, further comprising:

identifying the one or more password instruction based on the origin of the computer-readable file by querying one or more information sources of a group comprising: (i) email; and (ii) documents stored in memory.

13. The method of claim 9, further comprising:

rendering a consent interface containing a control that enables or disables generation of the at least one password hint;

modifying a display to contain the consent interface; and generating the at least one password hint based in part on receiving an enable input to the control.

14. The method of claim 9, further comprising analyzing the user information for one or more candidate segments that comply with the one or more password instruction by training an artificial intelligence engine with the user information to identify the one or more candidate segments known to a user of the device.

15. The method of claim 9, further comprising:
in response to detecting a password input via the at least one input device that succeeds in one of decrypting or encrypting the computer-readable file:
training an artificial intelligence engine with the password input for subsequent identifications of candidate segments known to the user of the device.

16. The method of claim 9, further comprising:
in response to detecting a password input via the at least one input device that succeeds in one of decrypting or encrypting the computer-readable file:
storing a password hint that corresponds to the password for future use in decrypting the computer-readable file.

17. A computer program product comprising:
a computer readable storage device; and
program code on the computer readable storage device that when executed by a processor associated with an electronic device, the program code configures the electronic device to provide functionality of:
in response to detecting a password prompt, via at least one input device of an electronic device, to enter a password to perform one of password-encrypt or password-decrypt a computer-readable file:
identifying an origin of the computer-readable file;
identifying, based on the origin of the computer-readable file, one or more password instruction associated with the password;
analyzing user information for one or more candidate segments that comply with the one or more password instruction;
assembling at least one password hint mapping the one or more candidate segments according to the one or more password instruction;
rendering a prompt containing the at least one password hint; and
modifying at least output device to present the password prompt containing the at least one password hint, wherein the password prompt is associated with the computer-readable file and presented via the at least one output device.

18. The computer program product of claim 17, wherein the program code configures the electronic device to provide functionality of:
in response to detecting the password prompt to enter the password to password decrypt the computer-readable file:
identifying the origin of the computer-readable file by parsing file attributes and metadata.

19. The computer program product of claim 17, wherein the program code configures the electronic device to provide functionality of:
connecting, via a communications subsystem of the electronic device via a network, to at least one network device that administers password-encrypted operations with the computer-readable file; and
in response to detecting the password prompt to enter the password to password decrypt the computer-readable file, identifying the one or more password instruction based on an origin of the computer-readable file by querying, via the communication subsystem and the network, one or more websites associated with the computer-readable file.

20. The computer program product of claim 17, wherein the program code configures the electronic device to provide functionality of:
identifying the one or more password instruction based on the origin of the computer-readable file by querying one or more information sources of a group comprising: (i) email; and (ii) documents stored in memory.

* * * * *